United States Patent [19]

Morgan

[11] Patent Number: 4,460,468

[45] Date of Patent: Jul. 17, 1984

[54] LIQUID FILTER WITH COMBINED FILTRATION BAG AND LID SEALING GASKET

[75] Inventor: H. William Morgan, Michigan City, Ind.

[73] Assignee: Filter Specialists, Inc., Michigan City, Ind.

[21] Appl. No.: 486,798

[22] Filed: Apr. 20, 1983

[51] Int. Cl.$^3$ .............................................. B01D 35/02
[52] U.S. Cl. ................................... 210/445; 210/450; 210/453; 55/502
[58] Field of Search ............... 210/232, 453, 484, 491, 210/448, 452, 450, 444, 451, 454, 445; 55/369, 373, 377, 502

[56] References Cited

U.S. PATENT DOCUMENTS

| | | | |
|---|---|---|---|
| 2,767,851 | 10/1956 | Muller | 210/484 |
| 3,061,106 | 10/1962 | Bradbury | 210/232 |
| 3,640,392 | 2/1972 | Smith et al. | 210/453 |
| 3,771,664 | 11/1973 | Schrink et al. | 210/448 |
| 3,814,261 | 6/1974 | Morgan, Jr. | 210/232 |
| 3,959,137 | 5/1976 | Kirsgalvis | 210/232 |
| 4,081,379 | 3/1978 | Smith | 210/342 |
| 4,282,098 | 8/1981 | Morgan, Jr. | 210/238 |
| 4,283,281 | 8/1981 | Cogan | 210/484 |
| 4,285,814 | 8/1981 | Morgan, Jr. | 210/453 |
| 4,388,191 | 6/1983 | Morgan | 210/484 |

Primary Examiner—Peter A. Hruskoci
Assistant Examiner—Wanda L. Millard
Attorney, Agent, or Firm—James D. Hall

[57] ABSTRACT

A liquid filter with a unitary lid to housing seal and filtration bag. The seal is used as a gasket between the filter housing and the lid and is attached about the open upper end of the bag.

3 Claims, 2 Drawing Figures

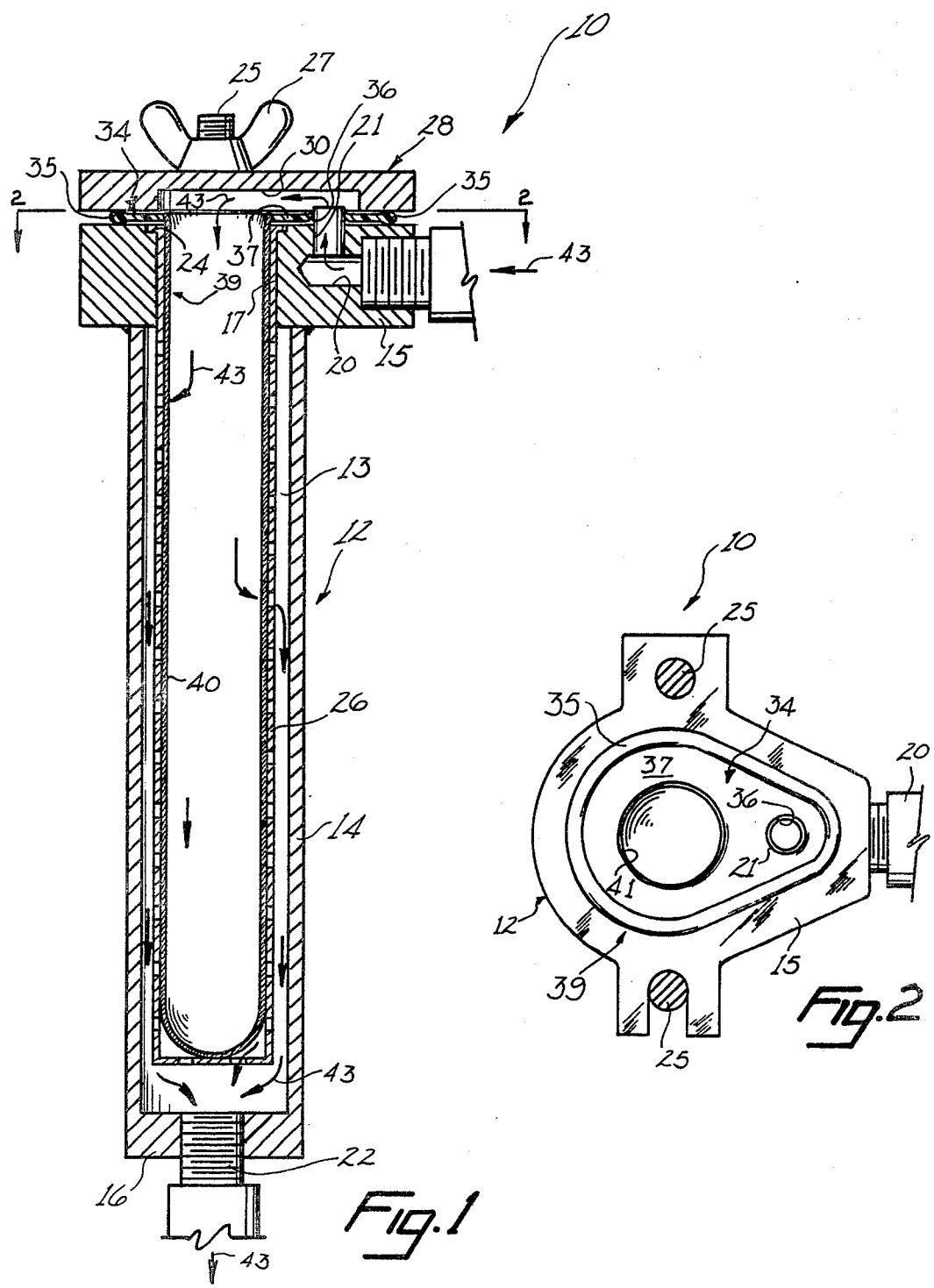

LIQUID FILTER WITH COMBINED FILTRATION BAG AND LID SEALING GASKET

SUMMARY OF THE INVENTION

This invention relates to a liquid filter, and more specifically, to a seal and filtration bag unit for a liquid filter.

The filter of this invention includes a housing having a side wall and a bottom wall. An inlet port and an outlet port are formed in the housing. The housing also has an upper opening defined by the upper end of the side wall. A lid spans the housing upper opening. A filtration bag is suspended within said housing and has its open end unitarily formed with a seal or gasket. The seal rests on the housing side wall upper end and is compressed thereagainst by the lid for sealing engagement of the lip with the housing.

Accordingly, it is an object of this invention to provide a liquid filter having a unitary lid seal and filtration bag.

Another object of this invention is to provide a liquid filter which does not require an O-ring or similar seal for sealing engagement of the lid and the filter housing.

Another object of this invention is to provide a filtration bag which is for a liquid filter and which includes an integral gasket for sealing the filter lid to the filter housing.

Other objects of this invention will become apparent upon a reading of the following description.

BRIEF DESCRIPTION OF THE DRAWINGS

A preferred embodiment of this invention has been chosen for purposes of description wherein:

FIG. 1 is a longitudinal sectional view of a liquid filter and the filtration bag of this invention used therein.

FIG. 2 is a sectional view of the filter taken along line 2—2 of FIG. 1.

DESCRIPTION OF THE PREFERRED EMBODIMENT

Figure 3:
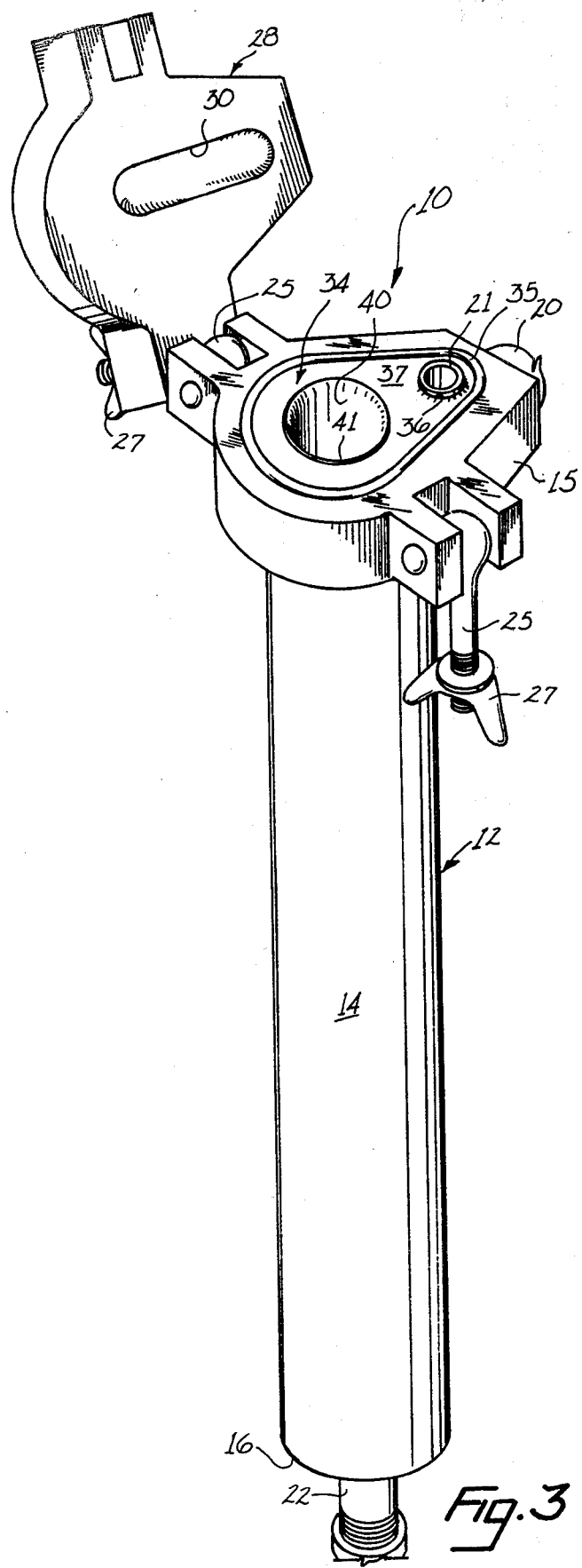
FIG. 3 is a perspective view of the filter of FIG. 1 showing the top opened.
Figure 4:
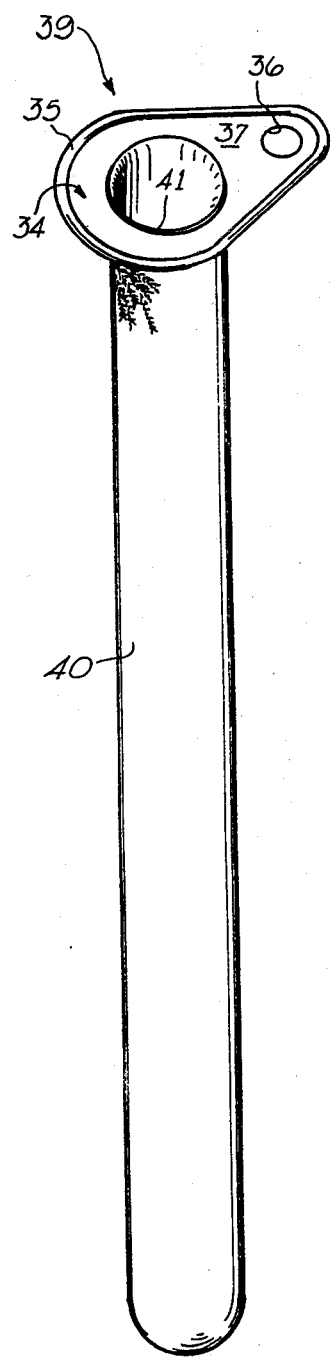
FIG. 4 is a perspective view of the filtration unit used in the filter of FIG. 1.

The preferred embodiment illustrated is not intended to be exhaustive or to limit the invention to the precise form disclosed. It is chosen and described in order to explain the principles of the invention and practical use to thereby enable others skilled in the art to utilize the invention.

Liquid filter 10 includes a housing 12 having a side wall 14 and a bottom wall 16. Housing side wall 14 includes a wall plate 15 which defines the upper end of the side wall. An opening 17 extends through plate 15 into the interior 13 of housing 12. An inlet port 20 extends transversely into housing wall plate 15 and turns upwardly in the form of a tube 21 to project above the upper surface of the wall plate. An outlet port 22 is formed in housing bottom wall 16. A shoulder 24 is formed in the upper surface of housing wall plate 15 about housing opening 17. A reticulated shape-retaining basket 26 is preferably placed within housing interior 13 and supported at its flanged top by housing shoulder 24.

A top or lid 28 spans wall plate opening 17 and overlies the upper surface of housing wall plate 15. A channel 30 is formed in the inner surface of lid 28 and provides a flow passage between inlet port 20, over its tube 21, and housing opening 17. Hold-down bolts 25 and nuts 27 are provided for anchoring lid 28 to housing 12 and securing the lid over housing opening 17. As so far described above, and except for the use of inlet port tube 21, the embodiment of this invention is generally similar to that disclosed in U.S. Pat. No. 3,814,261.

A filtration unit 39 is supported by housing 12 within basket 26. Each filtration unit 39 includes a bag 40 which is generally of an interwoven fibrous filtration material and a gasket or seal 34 which is generally a flexible, compressible, liquid impervious material such as rubber. Seal 34 is integrally connected to bag 40 about its opening 41 such as by an adhesive or heat sealing so as to form the unitary filtration unit 39. The outer edge of seal 34 is of thickened dimension so as to form a peripheral bead 35. A tapered opening 36 is formed between bag opening 41 and bead 35 in the web 37 of seal 34.

Bag 40 of the filtration unit, with lid 28 of the filter opened, is inserted through wall plate opening 17 and fitted within basket 26. Seal 34 is supported upon the upper surface of housing wall plate 15 with inlet port tube 21 extending through opening 36 in the seal. The fit of seal 34 at its beveled opening 36 about inlet port tube 21 is constrictive with the seal about its beveled opening forming a liquid-tight, flexed contact with the inlet port tube. Filter lid 28 is placed over the filtration unit with the lower surface 29 of the lid contacting bead 35 of filtration unit seal 34. Upon the tightening of nuts 27 upon hold-down bolts 25 of the filter, filtration unit seal 34 is compressed particularly at its head 35 between the lid and the housing 12 to form a liquid-tight seal about the periphery of the filtration unit.

Liquid flow into the filter through inlet 20 passes upwardly through inlet port tube 21 and across lid 28 within its internal channel 30, over bag opening 41 and into bag 40. Liquid then passes through the filtering medium of bag 40, through the reticulated openings 27 in basket 26 and out outlet port 22 of the filter, as shown by arrows 43 in FIG. 1. When necessary, filter lid 28 can be opened and the filtration unit, which includes bag 40 and integral seal 34, removed and a new filtration unit replaced within the filter. In this manner the filtration unit serves both as a gasket between the filter lid and the housing and as the filtration medium for the filter. It is to be understood that in some constructions of the filter it would not be necessary to include a supporting basket 26. Instead, the filtration unit consisting of a flexible bag and integral seal would be used by itself within the filter housing.

It is to be understood that the invention is not to be limited by the details above given but may be modified within the scope of the appended claims.

I claim:

1. In a liquid filter including a housing having a side wall and a bottom wall, an inlet port and an outlet port, said housing having an opening defined by the upper end of said side wall, a lid spanning said housing opening, a removable filtration bag suspended within said housing and having an open upper end positioned between said inlet and outlet ports, the improvement wherein said inlet port includes a tubular protrusion extending upwardly from said housing side wall upper end in a spaced relationship from said housing opening, said lid including portions spaced above said bag open upper end and said inlet port protrusion to define a liquid flow passage between the protrusion and bag open upper end over a removable flexible generally planar seal, said seal unitarily attached to said bag about said bag open upper end, said seal extending peripherally about said housing opening and positioned between said housing side wall upper end and said lid to provide complete peripheral liquid sealing engagement between the lid and the housing, said seal having an opening spaced from said bag open upper end, said seal fitting at its said opening in sealing engagement around said inlet port protrusion.

2. The liquid filter of claim 1 and a reticulated basket suspended in said housing, said bag extending into said basket.

3. A filtration unit for use in a liquid filter having a housing with an upper opening into the interior of the housing and a removable lid spanning said housing opening, said filter including an inlet port and an outlet port, said filtration unit comprising a liquid pervious bag having an opening and a flexible generally planar seal unitarily attached to said filter bag about its opening, said filtration unit adapted to fit in said liquid filter with said bag being received in said housing interior and said seal resting on said housing about said housing opening, said seal defining means for providing complete peripheral liquid sealing engagement between said lid and said housing and including a flange-like body having a peripheral bead adapted to be compressed between the lid and housing, said seal having opening means formed between said bead and said bag opening for positioning over said filter inlet port in a liquid-tight fit about the inlet port.

* * * * *